(12) United States Patent
Faletti et al.

(10) Patent No.: US 6,209,530 B1
(45) Date of Patent: *Apr. 3, 2001

(54) CONTROL SYSTEM FOR EXHAUST GAS RECIRCULATION SYSTEM

(75) Inventors: James J. Faletti, Spring Valley, IL (US); Alois Amstutz, Knonau (CH)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/254,163

(22) PCT Filed: Jul. 3, 1998

(86) PCT No.: PCT/US98/13920

§ 371 Date: Mar. 1, 1999

§ 102(e) Date: Mar. 1, 1999

(87) PCT Pub. No.: WO99/01652

PCT Pub. Date: Jan. 14, 1999

Related U.S. Application Data

(63) Continuation-in-part of application No. 08/888,167, filed on Jul. 3, 1997, now Pat. No. 5,771,867.

(51) Int. Cl.$^7$ .................................................. F02M 25/07
(52) U.S. Cl. ................................. 123/568.21; 60/602.5; 123/559.2
(58) Field of Search ................... 123/568.11, 568.12, 123/568.17, 568.18, 568.19, 568.2, 568.21, 568.26, 568.27, 568.28, 559.2; 60/605.2, 602

(56) References Cited

U.S. PATENT DOCUMENTS

| | | |
|---|---|---|
| 4,428,355 | 1/1984 | Yokooku ..................... 123/406.13 |
| 4,466,416 | 8/1984 | Kawamura ....................... 123/378 |
| 4,561,407 | 12/1985 | Jaussi et al. .................... 123/559.2 |
| 4,702,218 | 10/1987 | Yoshioka et al. ................ 623/559.2 |
| 4,723,525 | 2/1988 | Fried et al. ..................... 123/559.2 |
| 5,052,362 | 10/1991 | Jenny et al. .................... 123/559.2 |
| 5,201,300 | 4/1993 | Iiyama ............................. 123/299 |
| 5,284,123 | 2/1994 | Dones ............................. 123/559.2 |
| 5,406,796 | * 4/1995 | Hiereth et al. .................... 60/605.2 |
| 5,601,068 | 2/1997 | Nozaki .............................. 123/676 |
| 5,682,864 | 11/1997 | Shirakawa ..................... 123/568.21 |
| 5,771,867 | * 6/1998 | Amstutz et al. .............. 123/568.21 |
| 5,918,582 | * 7/1999 | Itoyama et al. .................. 123/480 |
| 6,003,316 | * 12/1999 | Baert et al. ....................... 60/605.2 |

FOREIGN PATENT DOCUMENTS

| | | |
|---|---|---|
| 19628235 | 1/1997 | (DE) . |
| 19615545 | 6/1997 | (DE) . |
| 19620039 | 11/1997 | (DE) . |
| 19753450 | 6/1998 | (DE) . |
| 0752523 | 1/1997 | (EP) . |
| 2 443 582 | 7/1980 | (FR) . |
| 2 526 873 | 11/1983 | (FR) . |
| 59-049359 | 3/1984 | (JP) . |
| 96/18030 | 6/1996 | (WO) . |

* cited by examiner

*Primary Examiner*—Willis R. Wolfe
(74) *Attorney, Agent, or Firm*—Robert J. Hampsch; Michael R. Huber

(57) ABSTRACT

A system and method for controlling an exhaust gas recirculation system (10) on an electronically controlled, turbocharger (18) equipped internal combustion engine (12) having two or more actuating devices (84,86). In the disclosed embodiments, the actuating devices (84,86) may include an exhaust gas recirculation valve (40), a turbocharger back pressure valve (44), the vane actuators (46) in a variable geometry turbocharger (48), or an air intake throttle valve.

17 Claims, 3 Drawing Sheets

CONTROL SYSTEM FOR EXHAUST GAS RECIRCULATION SYSTEM

This is a continuation-in-part of application Ser. No. 08/888,167, filed Jul. 3, 1997 and issued Jun. 30, 1998, U.S. application Ser. No. 5,771,867.

TECHNICAL FIELD

The present invention relates to emission control system for an internal combustion engine, and more particularly, to exhaust gas recirculation (EGR) control system and apparatus for internal combustion engines which will operate to minimize NOx and other emissions while minimizing particulate matter emissions from internal combustion engines.

The present invention generally relates to a system and technique for controlling a pair of actuators in an EGR system of an internal combustion engine and, more particularly, is concerned with an engine control strategy for improving responsiveness and the operating characteristics of the actuators.

BACKGROUND ART

Exhaust gas recirculation is a technique commonly used for controlling the generation of undesirable pollutant gases and particulate matter in the operation of internal combustion engines. This technique has proven particularly useful in internal combustion engines used in motor vehicles such as passenger cars, light duty trucks, and other on-road motor equipment. The exhaust gas recirculation technique primarily involves the recirculation of exhaust gas by-products into the intake air supply of the internal combustion engine. The exhaust gas reintroduced to the intake manifold and subsequently the engine cylinders reduces the concentration of oxygen therein, which in turn lowers the maximum combustion temperature within the cylinder, decreasing the formation of nitrous oxide. Furthermore, the exhaust gases typically contain a portion of unburned hydrocarbon which is burned on its reintroduction into the engine cylinders, which further reduces the emission of exhaust gas by-products which would be emitted as undesirable pollutants from the internal combustion engine.

However, it is necessary to carefully control the proportion of recirculated exhaust gas to intake air. For example, while a greater proportion of exhaust gas may be recirculated at low load levels, it is necessary to ensure that the proportion of recirculated exhaust gas does not become excessive, causing the engine to stop due to a lack of sufficient oxygen to mix with the fuel so as to permit combustion. On the other hand, if the proportion of exhaust gas recirculated at full engine load is excessive, the power output of the internal combustion engine is reduced, and the engine will typically emit undesirable quantities of smoke and particulate matter due to unsatisfactory combustion in the engine cylinders. Therefore, it is clear that the exhaust gas recirculation process is desirably tightly controlled.

Another technique useful in the control and reduction of undesirable emissions from internal combustion engines is the use of pressure-charged intake air. This permits the use of relatively smaller cubic displacement and lighter weight internal combustion engines in mobile equipment, reducing in turn the specific fuel consumption of the vehicle and overall mass of the vehicle necessary to perform a given function. In addition to the benefits of reduced size and mass, the typical pressure-charging device may be controlled to provide improved emissions characteristics. Pressure-charging machines suitable for such applications include the exhaust gas driven turbocharger which is comprised typically of an exhaust gas driven turbine linked to a compressor disposed in the intake air stream to provide compression of the intake air. One way of controlling a turbocharger is to provide a gate which controls exhaust gas flow and gates exhaust gas to bypass the exhaust gas turbine and control the charging rate of the turbocharger so that the maximum pressure limits of the associated internal combustion engine are not exceeded. Another means of controlling a turbocharger is to provide a variable geometry turbocharger which allows for variation of the turbocharger vane position in response to engine speed or engine load or both. Change in vane position affects the manifold pressures within the engine air system which in turn affects the recirculation rate of exhaust gases from the exhaust manifold to the intake manifold.

Current EGR systems are generally used when an exhaust manifold pressure is greater than the pressure in the inlet manifold. In a pressure charged engine, including turbocharged and supercharged engines as examples, the pressure in the inlet manifold typically increases as the engine load increases. As the pressure in the exhaust manifold approaches the pressure in the inlet manifold, the exhaust gas recirculation flow in a fixed diameter orifice or duct between the inlet manifold and the exhaust manifold decreases. Higher engine speeds and engine loads also generally result in an increase in NOx emissions. Conventional EGR systems provide little, if any, exhaust gas recirculation during times when the engine is producing the most NOx, because the low pressure differential between the exhaust manifold and the inlet manifold prevents sufficient exhaust gas from entering the inlet manifold. Thus, EGR flow rate and turbocharger boost pressure represent engine operating parameters that are indirectly linked, yet often independently controlled. The present invention is aimed at overcoming the aforementioned problems.

DISCLOSURE OF THE INVENTION

The present invention is a system and method for controlling an exhaust gas recirculation (EGR) system in an internal combustion engine having two or more actuating devices on a pressure-charged internal combustion engine. In the various disclosed and/or contemplated embodiments, the actuating devices may include an air intake throttle valve, an exhaust gas recirculation (EGR) valve, an EGR bypass valve, a turbocharger back pressure valve, and/or the adjustable turbine blades in a variable geometry turbocharger.

In one aspect, the present invention may be characterized as a control system for an engine exhaust gas recirculation system having two or more actuating devices. The disclosed control system includes a pair of actuators and a controller adapted for receiving two or more engine operating parameter inputs and providing two or more actuator control output signals. In a disclosed embodiment, the first actuator is coupled to the controller and is adapted for receiving, as an input, a first actuator control output signal from the controller which is based, in part, on the engine operating parameter inputs. The first actuator is further connected to a first actuating device, such as an exhaust gas recirculation system and is adapted for controlling the first actuating device in response to the first actuator control output signal. The disclosed embodiment also includes a second actuator coupled to the controller and having an input for receiving a second actuator control signal from the controller. As with the first actuator, the second actuator is further connected to a second actuating device of the exhaust gas recirculation system and is adapted for controlling the second actuating device in response to the second actuator control output signal. The second actuator control output signal is generated by the controller based on a variance signal or similar such feedback from the first actuator together with the engine operating parameter inputs. Using the feedback, the first and second actuators are operatively coupled. In other words, the second actuator is responsive when the first actuator command signal exceeds prescribed actuator limits to the first actuator. However, when the first actuator is commanded or operating within the prescribed actuator limits, the variance or feedback signal is zero and the second actuator operates more or less independently of the first actuator.

The present invention may also be characterized as a method of controlling an exhaust gas recirculation system having two or more cooperatively controlled actuating devices. The disclosed method involves the steps of: (1) receiving two or more engine operating parameter inputs; (2) producing an actuator command signal in response to the engine operating parameter inputs; (3) producing an actuator control output signal based on the actuator command signal and prescribed actuator limits which are based, in part on the engine operating parameter inputs; and (4) controlling the first actuator in response to the actuator control output signal. The disclosed method further includes the steps of: (5) producing an actuator variance signal through the comparison of the actuator control output signal and the actuator command signal; (6) producing a second actuator control output signal based on the variance signal and the engine operating parameter inputs wherein the second actuator is controlled in response to the second actuator control output signal. Using the presently disclosed method, the first and second actuators are cooperatively controlled in that the second actuator is actively controlled when the first actuator command signal exceeds the prescribed actuator limits thereby producing a variance signal. When the first actuator is operating within the prescribed limits, the variance signal is zero (i.e. control output signal is equal to command signal) and the second actuator operates independently of the first actuator.

These and other aspects, features and advantages of the invention will become apparent to those skilled in the art upon a reading of the following detailed description when taken in conjunction with the drawings illustrating various embodiments of the invention.

DESCRIPTION OF THE PREFERRED EMBODIMENT

The following description is of the best mode presently contemplated for carrying out the invention. This description is not to be taken in a limiting sense, but is made merely for the purpose of describing the general principals of the invention. The scope and breadth of the invention should be determined with reference to the claims.

Figure 1:
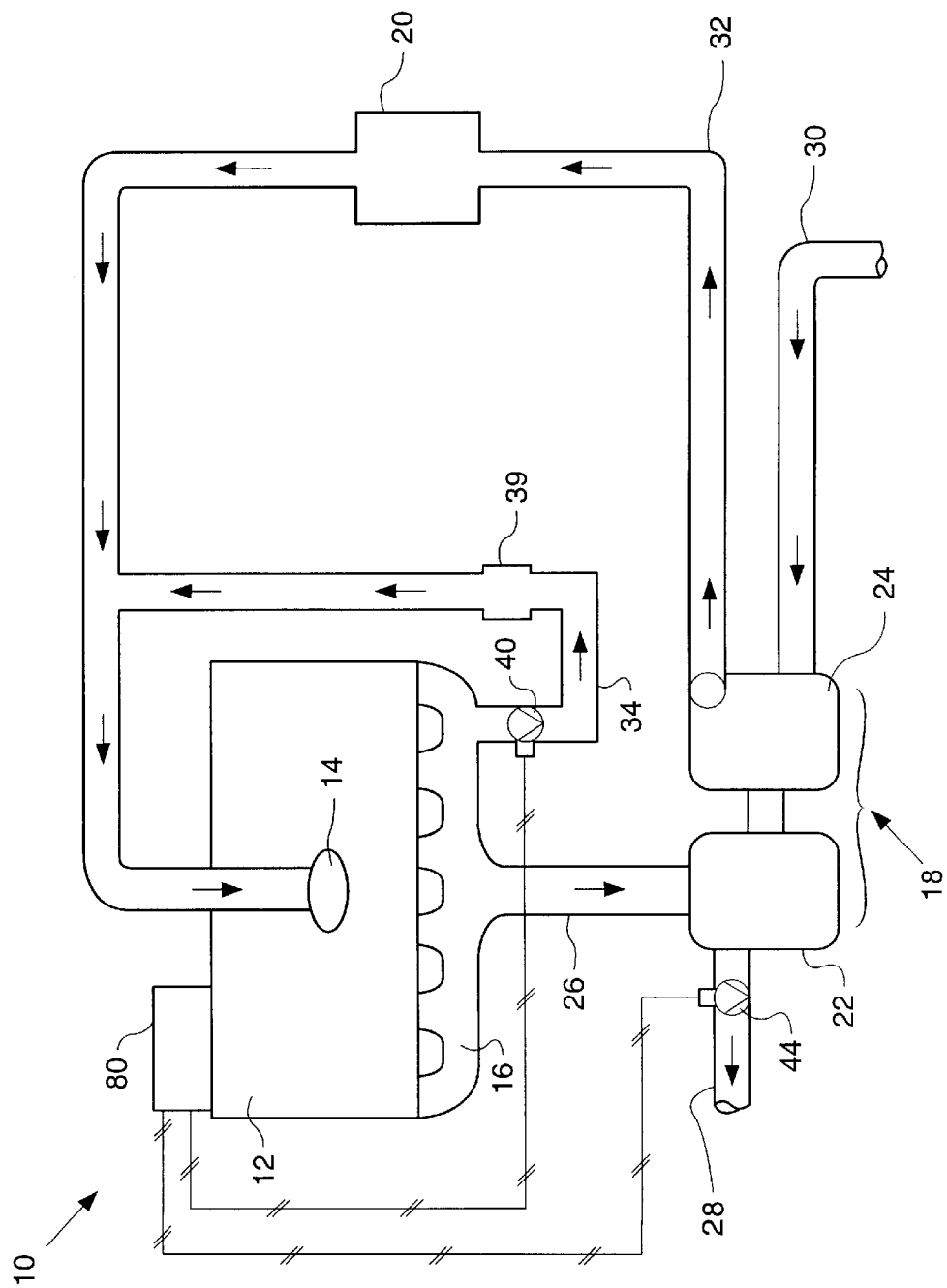
FIG. 1 discloses schematically an exhaust gas recirculation system according to the present invention as employed in a representative internal combustion engine having a turbocharger as the air intake pressurizing device wherein the system cooperatively controls an exhaust gas recirculation (EGR) valve in conjunction with the turbocharger back pressure valve.

Turning now to the drawings and particularly to FIG. 1 there is shown a schematic representation of an exhaust gas recirculation (EGR) system 10 for a turbocharged compression ignition engine 12 (i.e. diesel engine). As seen therein, the turbocharged compression ignition engine 12 includes an intake manifold 14, exhaust manifold 16, a turbocharger 18, and an air-to-air aftercooler 20. The turbocharger 18 having an exhaust gas driven turbine 22 coupled to an intake air compressor 24. The turbocharger 18 also includes an exhaust gas inlet 26 and an exhaust gas outlet 28 both in fluid communication with the exhaust gas driven turbine 22. The turbocharger 18 further includes a fresh intake air conduit 30 and a compressed air exit conduit 32 both of which are in fluid communication with the air compressor 24.

In the preferred embodiment, the EGR system 10 includes an EGR conduit 34 and an optional EGR cooler. As seen in FIG. 1, the EGR conduit 34 is disposed in fluid communication with the exhaust manifold or a select number of combustion chambers and is adapted for diverting a flow of exhaust gas from the exhaust manifold to a position downstream of the turbocharger 18 and air-to-air aftercooler 20 and proximate the intake manifold 14. The diverted flow of exhaust gas from the exhaust manifold via the EGR conduit 34 is controlled using one or more EGR valves 40 operatively associated with an engine controller 80 or similar such engine control module.

The engine controller 80, as is known to those skilled in the art, will typically contain various means for controlling the operation of the engine in response to sensed measurements of various operating parameters of the engine as provided to the controller 80 by various sensors disposed on and in conjunction with the engine. As it relates to the present EGR system, the controller 80 is provided with a means for sensing the operating speed and load of the engine by way of means generally known to those skilled in the art. The engine controller 80 is also adapted for controlling the fuel injector (not shown), to control the quantity, timing, and duration of fuel injected into the combustion chamber of the engine. The engine controller 80 is often adapted for controlling the air intake valves (not shown) and exhaust valves (not shown) associated with each of the engine cylinders.

In addition to controlling the air and fuel systems of the engine, the engine controller 80 is a processor based device or means for providing control of an exhaust gas recirculation (EGR) system of the engine, providing independent and simultaneous control of the EGR valve 40 and the turbocharger back pressure valve 44. In a preferred mode of operation, the controller 80 actuates the EGR valve 40 to a prescribed position prior to actuating the back pressure valve 44 thereby optimizing the recirculation of exhaust gas to the combustion chamber at prescribed engine speeds and loads. As the load demand on the engine increases, the controller 80 continuously actuates the EGR valve 40 and the turbocharger back pressure valve 44 to cause a continuous transition of control from the EGR valve 40 or first actuating device to the turbocharger back pressure valve 44 or second actuating device. This cooperative control of both the EGR valve 40 and the turbocharger back pressure valve 44 permits the controller 80 to function as a closed loop controller on these elements, for permitting precise and responsive control of the exhaust gas recirculation rate through the exhaust gas recirculation conduit 34 in most operating modes of the engine.

Figure 2:
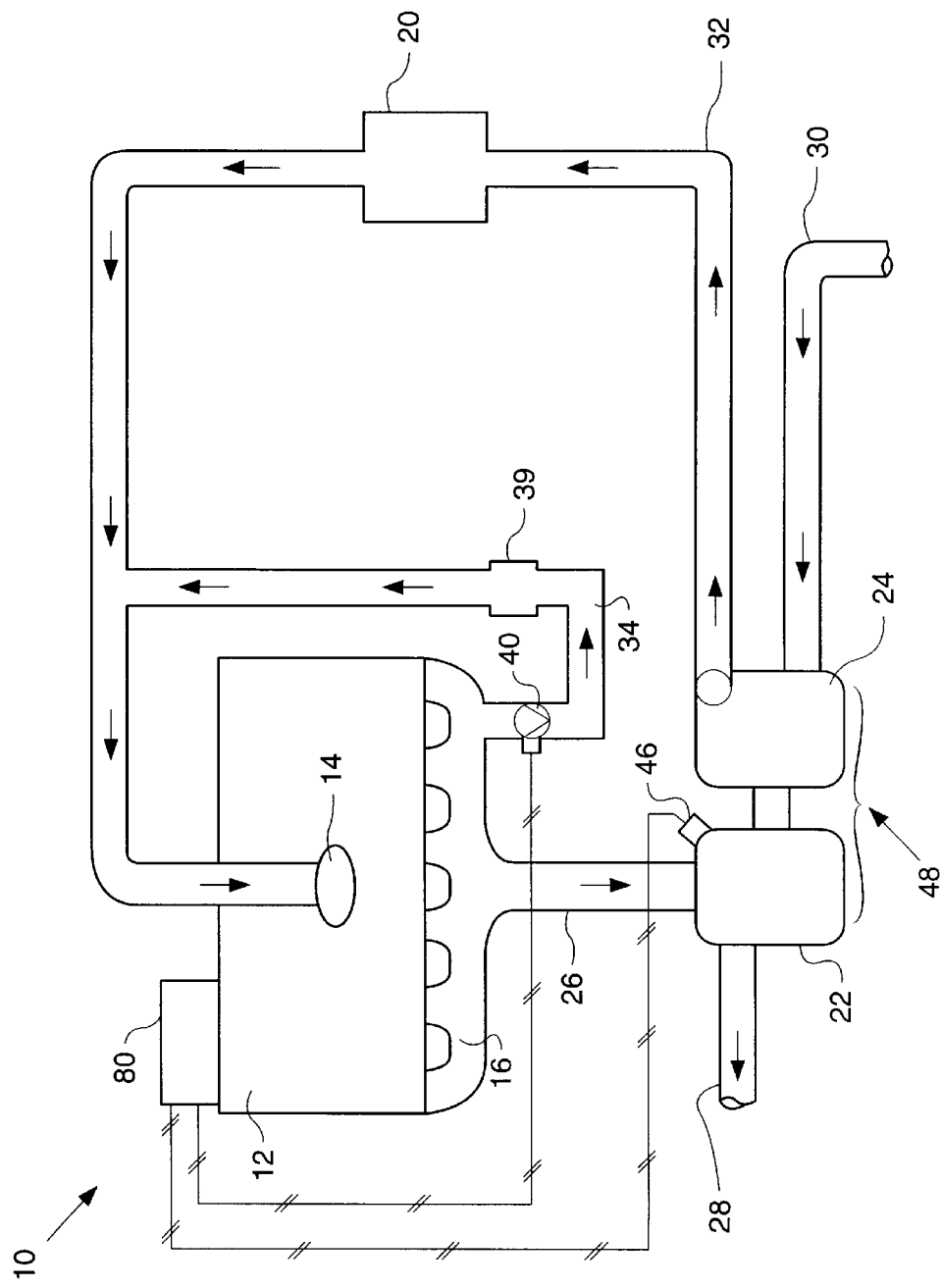
FIG. 2 discloses yet another embodiment of an exhaust gas recirculation system employed in a representative internal combustion engine having a turbocharger as the air intake pressurizing device and wherein the system cooperatively controls an exhaust gas recirculation (EGR) valve in conjunction with the actuator of a variable geometry turbocharger.

The embodiments of FIG. 2 is very similar from a structural and operation standpoint, to the embodiment of FIG. 1. The notable differences include the turbocharger and the controlled actuating devices. The principle of operation or cooperation between two actuating devices of the EGR system, however, are quite similar for both embodiments. For example, in the embodiment illustrated in FIG. 2, the intake air pressurizing device is preferably a variable geometry exhaust gas driven turbocharger 48 and the first actuating device is the exhaust gas recirculation (EGR) valve 40 operatively associated with an EGR conduit 34. The embodiment of FIG. 2 however, contemplates using the variable geometry turbocharger vane actuators 46 as the second actuating device.

The basic control of a variable geometry turbocharger is realized by actuating or adjusting the position of the vanes of the turbine. In this manner, as the engine goes through a change in load the vanes on the turbocharger close or open to some prescribed position or limits in accordance with various engine operating maps or look up tables found within the engine controller 80. Closing the vanes cause the turbocharger to spin faster for a given air flow and thereby increases the intake manifold pressure. Increasing the intake manifold pressure in turn affects the EGR flow rate. Conversely, opening the turbocharger vanes operates to slow the spin of the turbocharger and decrease the intake manifold pressure which likewise affects the EGR flow rate. It is important to note that changing the EGR flow rate in turn affects the exhaust gas flow to the turbocharger so that it becomes that much more important to precisely and cooperatively control exhaust gas flow through the turbocharger as well as EGR flow to the intake manifold.

Figure 3:
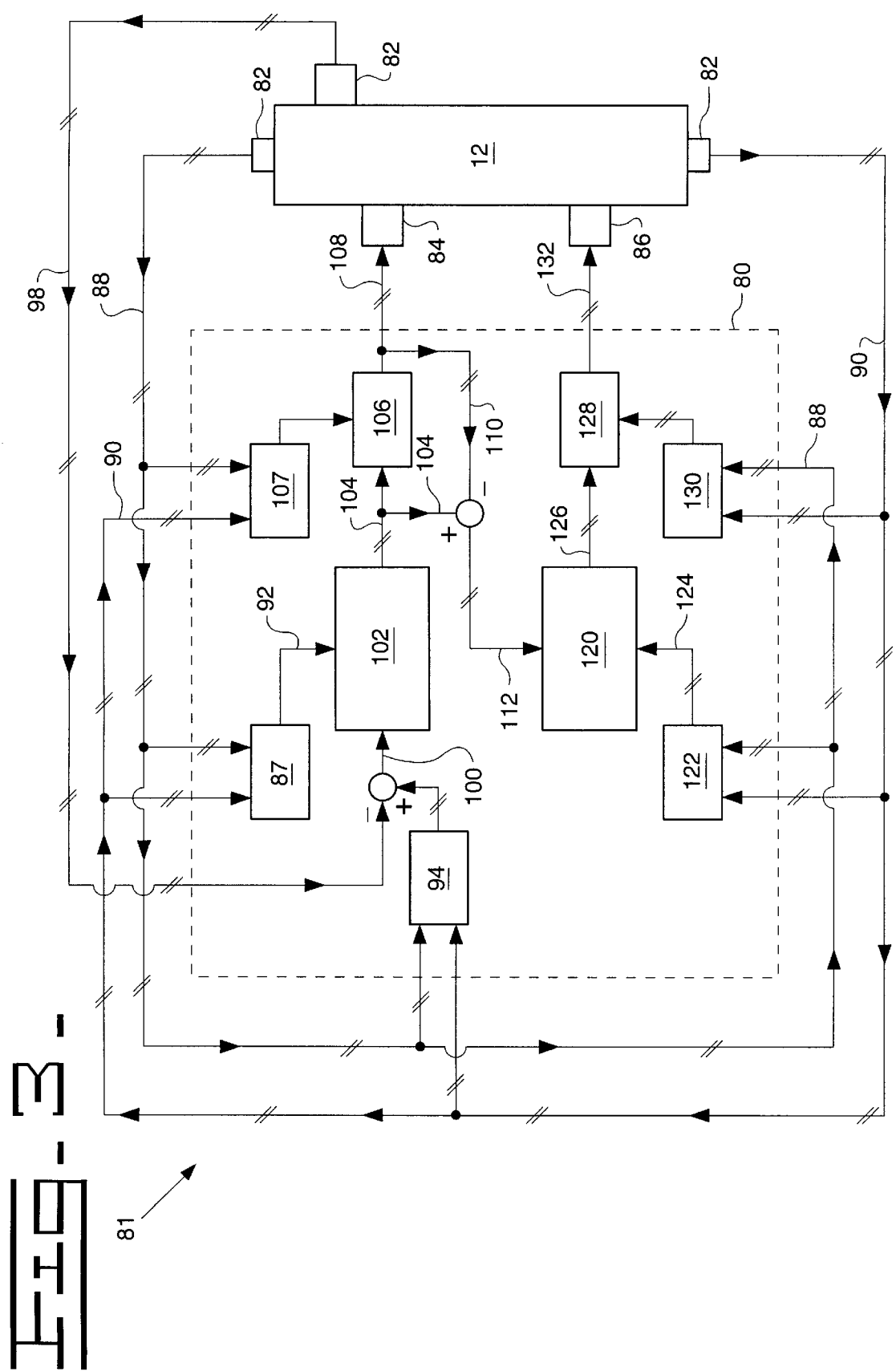
FIG. 3 is a general block diagram of the exhaust gas recirculation control system in accordance with the principles of the present invention.

Referring now to FIG. 3, there is shown a functional block diagram of the preferred or contemplated control system, generally designated by the numeral 81. As illustrated, the EGR control system 81 is operatively coupled to a pair of actuators 84, 86 for controlling the operation selected mechanisms such as air or exhaust flow valves associated with the engine. In the illustrated embodiment, the actuators 84, 86 are operatively coupled to an EGR valve 40 and a second actuating device such as a turbocharger back pressure valve or a vane actuator of a variable geometry turbocharger. The disclosed EGR control system 81 also incorporates a feedback loop wherein one of the actuator control signal outputs is used as an input to the control of the other actuator. The EGR control system 81 also utilizes one or more measured engine operating parameters as input signals. In the present embodiment, the EGR control system 81 utilizes measured parameters such as the engine speed and engine load. Similar such engine operating parameters such as engine operating temperatures, coolant temperatures, air mass flow, fuel mass, air intake temperatures, throttle position, and the like, can also be used.

In the illustrated embodiment, the EGR control system 81 operates by determining a EGR valve target position 87 based on selected engine operating parameters such as the measured engine speed 88 and the desired fuel mass 90 which generally corresponds to engine load. The EGR valve target position 87 is then converted to an EGR actuator voltage signal 92. Concurrently, the intake manifold conditions and air mass flow conditions are ascertained 94 from appropriate engine operating sensors 82. The measured engine speed 88 and the fuel mass 90 parameters are used as inputs together with the engine intake manifold conditions and air mass flow conditions to yield an intake variance signal 100.

The intake variance signal 100 together with the EGR actuator voltage signal 92 are forwarded to the EGR controller 102 for determining the commanded EGR actuator signal 104. The commanded EGR actuator signal 104 is forwarded to an EGR limiter 106 which adjusts, if necessary, the commanded EGR actuator signal 104 to fall within prescribed limits 107. The prescribed limits 107 are preferably determined using various engine operating parameters such as the aforementioned engine speed 88 and engine load 90 parameters. The adjusted or corrected EGR actuator signal 108 is then forwarded to the EGR actuator 84 thereby commanding the EGR valve 40 to the appropriate position.

A feedback signal 110, representing the corrected EGR actuator signal, is then compared to the commanded EGR actuator signal 104 to yield an EGR actuator variance signal 112. Any variance between the corrected EGR actuator signal 108 and the commanded EGR actuator signal 104 is embodied in the EGR actuator variance signal 112 which is used as an input to the turbocharger valve controller 120. Concurrently, the control system 81 is also determining a turbocharger valve target position 122 based on the selected engine operating parameters such as the measured engine speed 88 and the desired fuel mass 90 or engine load. The turbocharger valve target position 122 is converted to a turbocharger actuator voltage signal 124 which, along with the EGR actuator variance signal 112, are input to the turbocharger valve controller 120 for purposes of determining the commanded turbocharger actuator signal 126. The commanded turbocharger actuator signal 126 is forwarded to a turbocharger limiter 128 which adjusts, as required, the commanded turbocharger actuator signal 126 to within prescribed limits 130. As with the EGR limiter, the prescribed limits 130 for the turbocharger actuator 86 are preferably determined using various engine operating parameters such as the engine speed 88 and fuel mass 90 parameters. The corrected turbocharger actuator signal 132 is forwarded to the turbocharger actuator 86 thereby commanding the turbocharger back pressure valve 44 or the variable geometry turbocharger vane to the appropriate position.

Having commanded the EGR actuator 84 and turbocharger actuator 86 to the desired positions, within the engine, the air flow mass and other engine operating parameters are measured to yield the new inputs for the control system 81. In this manner, the EGR control system 81 operates in a continuous manner at most engine operating conditions.

It can be seen that the subject invention provides a number of advantages including a reduction of harmful or undesirable emissions, such as particulate matter and NOx from the engine for a given speed and load. These advantages are realized due to the fact that the EGR valve is employed as a primary actuator for exhaust gas flow within the engine, with the turbocharger flow control devices (i.e. either back pressure valve or VGT vanes) providing a secondary and complementary control of the exhaust gas recirculation rate. This permits the exhaust gas recirculation rate to be controlled by the engine controller across most of the operating range of the engine.

From the foregoing, it should be appreciated that the present invention thus provides a control system and apparatus for exhaust gas recirculation system in an internal combustion engine. While the invention herein disclosed has been described by means of specific embodiments and processes associated therewith, numerous modifications and variations can be made thereto by those skilled in the art without departing from the scope of the invention as set forth in the claims or sacrificing all its material advantages.

What is claimed is:

1. A control system (81) for an exhaust gas recirculation system (10) having two or more actuating devices, said control system (81) comprising:

an engine controller (80) adapted for receiving two or more engine operating parameter inputs (88,90) and providing two or more actuator control output signals (108,132);

a first actuator (84) coupled to said engine controller (80) and having an input for receiving a first actuator control output signal (108) from said engine controller (80), said first actuator (84) further connected to a first actuating device of said exhaust gas recirculation system (10) and adapted for controlling said first actuating device in response to said first actuator control output signal (108);

a second actuator (86) coupled to said engine controller (80) and having an input for receiving a second actuator control output signal (132) from said engine controller (80), said second actuator (86) further connected to a second actuating device of said exhaust gas recirculation system (10) and adapted for controlling said second actuating device in response to said second actuator control output signal (132); and wherein said engine controller (80) is adapted to generate said second actuator control output signal (132) based on said engine operating parameter inputs (88,90) and said control signals associated with said first actuator (84).

2. The control system (81) of claim 1 wherein said first actuating device is an exhaust gas recirculation valve (40).

3. The control system (81) of claim 2 wherein said second actuating device is operatively associated with a turbocharger (18).

4. The control system (81) of claim 2 wherein said second actuating device is a turbocharger back pressure valve (44).

5. The control system (81) of claim 2 wherein said second actuating device is a vane actuator (46) for a variable geometry turbocharger (48).

6. The control system (81) of claim 2 wherein said second actuating device (86) is an air intake throttle valve.

7. The control system (81) of claim 1 wherein said engine controller (80) includes a processor and wherein said processor is adapted for generating a target position (87) for said first actuator (84) based on said engine operating parameter inputs (88,90,98).

8. The control system (81) of claim 7 wherein said processor is further adapted for generating a first actuator command signal (104) based on said target position (87) and said engine operating parameter inputs (88,90,98).

9. The control system (81) of claim 8 wherein said processor is further adapted for generating prescribed actuator limits (107) based on said engine operating parameter inputs (88,90,98), and wherein said prescribed actuator limits (107) are used to adjust said first actuator command signal (104) to yield said first actuator control output signal (108).

10. The control system (81) of claim 1 wherein said processor is further adapted for generating a target position (122) for said second actuator (86) based on said engine operating parameter inputs(88,90).

11. The control system (81) of claim 10 wherein said processor is further adapted for generating prescribed actuator limits (130) for said second actuator (86) based on said engine operating parameter inputs (88,90), and wherein said prescribed actuator limits (130) for said second actuator (86) are used to adjust said second actuator control output signal(132).

12. A method of controlling an exhaust gas recirculation system (10) in a turbocharged engine (12) having two or more cooperatively controlled actuating devices, said method comprising the steps of:

receiving two or more engine operating parameter inputs (88,90)

producing a first actuator command signal in response to said engine operating parameter inputs;

producing a first actuator control output signal in response to said first actuator command signal and one or more first actuator signal limits wherein said first actuator signal limits are determined based on said engine operating parameter inputs;

controlling a first actuator in response to said first actuator control output signal;

producing a second actuator control output signal in response to said first actuator control signal and said engine operating parameter inputs; and controlling a second actuator in response to said second actuator control output signal.

13. The method of controlling an exhaust gas recirculation system (10) as set forth in claim 12 wherein said first actuating device is an exhaust gas recirculation valve (40).

14. The method of controlling an exhaust gas recirculation system (10) as set forth in claim 12 wherein said second actuating device is operatively associated with a turbocharger (18).

15. The method of controlling an exhaust gas recirculation system (10) as set forth in claim 12 wherein said second actuating device is a turbocharger back pressure valve (44).

16. The method of controlling an exhaust gas recirculation system (10) as set forth in claim 12 wherein said second actuating device is a vane actuator (46) for a variable geometry turbocharger (48).

17. The method of controlling an exhaust gas recirculation system (10) as set forth in claim 12 wherein said second actuating device is an intake air throttle valve.

* * * * *